Oct. 24, 1933.    G. ULVICK    1,931,807

AUTOMOBILE TIRE VALVE CAP

Filed Aug. 10, 1931

Inventor
George Ulvick
By N. C. Johnson
Attorney

Patented Oct. 24, 1933

1,931,807

UNITED STATES PATENT OFFICE 1,931,807

AUTOMOBILE TIRE VALVE CAP

George Ulvick, St. Paul, Minn.

Application August 10, 1931. Serial No. 556,053

1 Claim. (Cl. 152—12)

The present invention relates to an automobile tire valve cap.

It is a fact well known to motorists that automobile tire valve caps constitute a source of annoyance due to the fact that in removing them from a tire valve for filling the tire with air they are usually laid down either on a fender or on the ground and frequently dirt or sand gets into the caps and in putting them on, this sand gets into the valve and lodges between the valve seat and the valve, causing a valve leak. Furthermore, due to their small size they are easily misplaced and lost.

Various attempts have been made by manufacturers to attach the valve cap to the valve stem so as to permit unscrewing the valve cap from the stem and still maintaining a connection between the cap and the stem. Such a device is shown in the British patent to Dale, No. 19,532, issued October 17th, 1895, and the British patent to Cole, No. 22,950, issued October 6th, 1897. These prior structures while apparently workable lack the ease of application and simplicity of a structure which would make such device appeal to the average motorist.

An object of the present invention is to make an improved and simplified automobile tire cap.

In order to attain this object, there is provided, in accordance with one feature of the invention, a valve cap having diametrically opposed, downwardly extending arms which are pivotally connected at their lower ends to a collar slidably mounted on the valve stem and having a member encircling the threaded portion of the valve stem to limit the upward movement of the collar at a point which would permit the valve cap to clear the upper end of the valve stem for a lateral swinging movement.

These and other features of the invention will be more fully brought out in the following description and the accompanying drawing, wherein.

Figure 1:
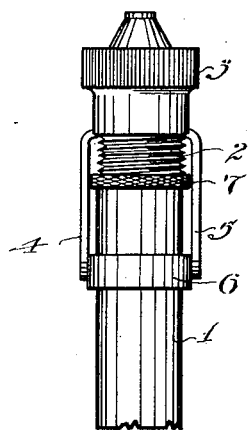
Figure 1 is a view in side elevation of the upper portion of an automobile tire valve stem with a valve cap and associated mechanism embodying the present invention in position thereon.

Referring to the drawing in detail and considering first the structure shown in the first three figures of the drawing, the valve stem 1 is of a conventional type having a threaded upper portion 2. A valve cap 3 is constructed to threadedly engage the threaded upper portion of the valve stem and is provided with a pair of downwardly projecting diametrically opposed arms 4 and 5, which are formed to extend downwardly and have pivotal engagement at their lower ends with a collar 6 which is slidably and rotatably mounted on the unthreaded portion of the valve stem. A retaining ring 7 is constructed to threadedly engage the threaded upper portion of the valve stem and is of larger exterior diameter than the unthreaded portion of the valve stem to limit the upward movement of the slidable collar 6.

Figure 2:
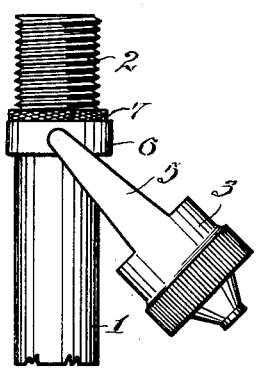
Figure 2 is a side elevation similar to Figure 1 with the valve cap swung to an inoperative position.
Figure 3:
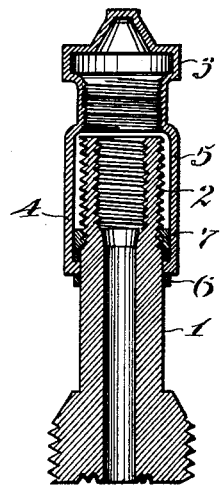
Figure 3 is a vertical sectional view through the structure shown in Figure 1, with the valve cap unscrewed from the valve stem.

To apply the valve cap structure to an automobile tire valve, the collar 6 is first slidably mounted over the valve stem with the cap in laterally offset position, as shown in Figure 2. The retaining ring 7 is then screwed onto the threaded portion of the valve stem and is screwed down to the lower end of the threaded portion, as illustrated in all of the first three figures of the drawing. The valve cap 3 may then be swung upwardly to the position shown in Figure 3 and the valve cap may then be screwed onto the threaded portion of the valve stem to the position shown in Figure 1.

Figure 4:
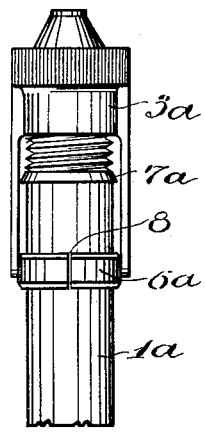
Figure 4 is a view similar to Figure 1 of a modified structure embodying the same invention.

In the modified structure shown in Figure 4 the valve stem 1a is formed at the factory with an integral shoulder portion 7a at the upper end of the unthreaded portion thereof of larger diameter than the lower portion of the valve stem. The slidable and rotatable collar 6a is of split construction, as illustrated at 8, and the collar 6a is preferably of spring material so that it may be forced downwardly over the shoulder portion 7a and is adapted to have a free slidable and rotatable fit over the unthreaded portion of the valve stem. The valve cap 3a is of substantially similar construction to that illustrated in Figures 1, 2, and 3.

Figure 5:
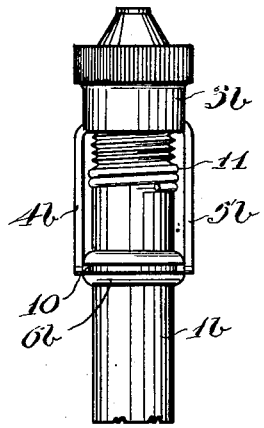
Figure 5 is a view similar to Figure 4 showing a modified construction.
Figure 6:
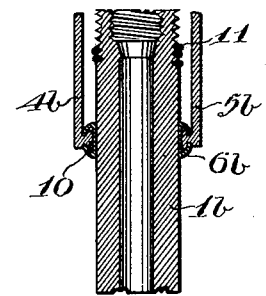
Figure 6 is a vertical sectional view of the structure shown in Figure 5 with the valve cap broken and the upper end of the valve stem broken away.
Figure 7:
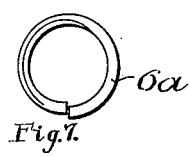
Figure 7 is a plan view of the retaining collar shown in Figure 4.
Figure 8:
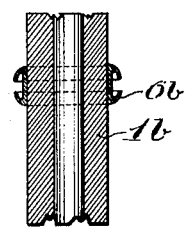
Figure 8 is a vertical sectional view of a portion of a valve stem and the slidable collar illustrated in Figure 5.
Figure 9:
Figure 9 is a view in perspective of a collar retaining spring illustrated in Figures 5 and 6.

In the structure shown in Figures 5 and 6, the valve cap 3b is constructed similarly to the previously illustrated and described constructions, except that the lower end of the arms 4b and 5b are provided with knobs 10 which are mounted to have a freely slidable fit in a channeled collar 6b, the channeled collar having a free slidable and rotatable fit on the valve stem. This gives an additional freedom for rotation of the valve cap in case the collar should become jammed on the valve stem which might interfere with the free rotation of the collar.

Instead of a threaded retaining ring such as the ring 7 illustrated in Figure 1; in this construction shown in Figures 5 and 6, a coil spring 11 is of a size to engage the threaded portion of the valve stem and project outwardly beyond the unthreaded portion of the valve stem a sufficient distance to retain the collar 10 in position below the threaded portion of the valve stem. The manner of application of this structure is similar to that described for the application of the structure shown in the first three figures of the drawing. The retaining spring 11 may also be used in the structure shown in the first three figures of the drawing instead of the ring 7.

The device comprises a simple and easily manipulated structure which can be applied to any standard present day tire valve and is well adapted for rapid and economical production, the cost of the present construction with modern manufacturing methods being but little more than that of an ordinary type of valve cap.

I claim:

A valve cap comprising in combination with a valve stem having threaded upper portion, a collar mounted for free slidable and rotatable movement on the lower portion of said valve stem, a helical wire member adapted to fit in the lower threads of said threaded upper portion, said wire being of sufficient diameter to limit the upward movement of said slidable collar, a valve cap adapted to have threaded engagement with the threaded upper portion of said valve stem and a pair of downwardly extending arms integral with said valve cap and having pivotal engagement with said collar at their lower end, said arms being of a length to permit said valve cap to clear the upper end of said valve stem when said slidable collar is in engagement with said retaining member.

GEORGE ULVICK.